March 22, 1927.
C. F. SHERWOOD
1,621,858
RECIPROCATING PUMP
Original Filed Jan. 19, 1921
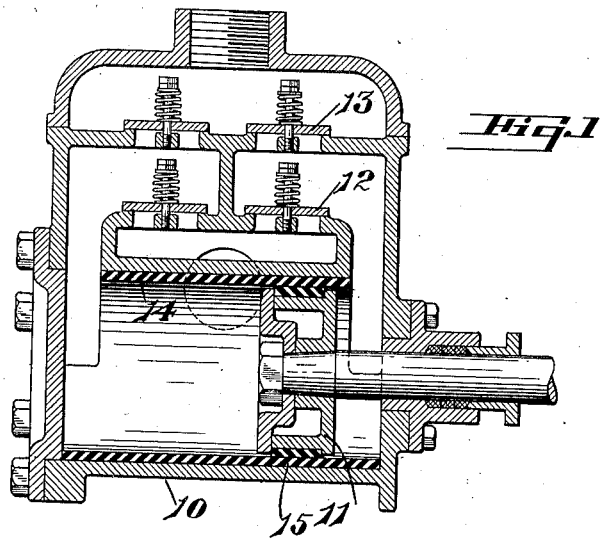
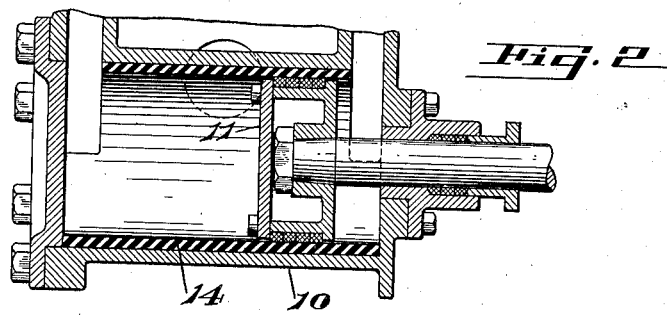
INVENTOR
CHARLES FREDERIC SHERWOOD
BY
Chas E. Townsend
ATTORNEY Patented Mar. 22, 1927.

1,621,858

UNITED STATES PATENT OFFICE.

CHARLES FREDERIC SHERWOOD, OF SAN FRANCISCO, CALIFORNIA.

RECIPROCATING PUMP.

Application filed January 19, 1921, Serial No. 438,355. Renewed March 25, 1926.

This invention relates to liquid pumps of the reciprocating type. The object is to produce a pump the sliding surfaces of which will have a low coefficient of friction and at the same time will be resilient and non-corrosive.

Rubber, if kept wet, has a surprisingly low coefficient of friction and I find that it can be successfully employed in the construction of walls of a cylinder or piston of a pump and is well suited for use in pumps handling liquids which contain sand or detritus in considerable quantities or which contain corrosive substances.

The present invention is not concerned with the particular method or manner of applying the rubber material to the cylinder walls or piston, and the accompanying drawings are to be considered as merely illustrative of one way of carrying out my invention.

Fig. 1 shows a central sectional view of a conventional type of pump wherein the cylinder walls are lined with rubber and the body of the piston has a covering of rubber.

Fig. 2 shows a similar view of a pump in which the cylinder walls only are lined with rubber and the piston is of the usual metal construction.

The pump herein shown includes a cylinder 10, reciprocating piston 11, intake valves 12 and outlet valves 13.

In Fig. 1 the cylinder is provided with a lining 14 of vulcanized rubber and the body of the piston is provided with a rubber covering 15. In Fig. 2 the cylinder only carries the rubber friction surface.

The coefficient of friction of rubber against rubber or rubber against metal when the rubber is kept wet is sufficiently low to permit of its practical use in a pump of this character. As is well known, rubber is non-corrosive and its resilience or yielding qualities make it impossible for sand or other detritus to cause any great wear of the rubber. Therefore rubber used in the construction of cylinder or piston walls will make the pump ideally suited for use in pumping acids or corrosive substances and also for pumping water or other liquids which contain a considerable quantity of sand or detritus. The rubber is sufficiently resilient and yielding to allow the sand particles to embed themselves therein so that there can be no undue wearing or scoring of the sliding surfaces.

The fit between the rubbing or sliding surfaces when rubber is used can be made just as tight as desired without danger of undue wearing or heating of the rubber. Consequently it is possible to maintain high pressures or vacuums in a pump of this sort. Inasmuch as the pump is used only for handling liquids the rubber friction surfaces will be kept damp at all times and the coefficient of friction will be kept within proper limits.

Having thus described my invention, what I claim and desire to secure by Letters Patent is—

1. A liquid pump including a cylinder, a reciprocating piston and a lining for the walls of the cylinder formed of rubber for sliding contact with the piston.

2. A liquid pump including a cylinder, a reciprocating piston, a lining for the walls of the cylinder formed of rubber and a covering for the body of the piston formed also of rubber, the rubber lining of the cylinder being in sliding contact with the rubber on the piston.

3. In a reciprocating pump, an outer metallic cylinder and an inner lining therefor made up of a sleeve of compressible wear resisting material.

4. In a pump, a cylinder of rigid material, a sleeve fitting closely therein made up of a compressible material such as rubber, and a reciprocating piston adapted to fit closely against said sleeve.

CHARLES FREDERIC SHERWOOD.